Nov. 1, 1960     E. F. PETERSON     2,958,227
VIBRATOR SYSTEM
Filed Aug. 20, 1959

*INVENTOR.*
E. F. PETERSON

BY

ATTORNEY

United States Patent Office 2,958,227
Patented Nov. 1, 1960

2,958,227

VIBRATOR SYSTEM

Edwin F. Peterson, % Martin Engineering Co., Neponset, Ill.

Filed Aug. 20, 1959, Ser. No. 835,083

15 Claims. (Cl. 74—61)

This invention relates to an improved vibrator system and more particularly to such system as employed in vibrators of the class used in creating agitating, settling, moving, shaking and like forces in structures or objects containing or handling fluent materials, and has for its principal object the provision of a novel concept in vibrator design employing mechanism for generating force components of various magnitudes and in selected directions.

In the conventional vibrator, one system employs a rotating weight which of course sets up centrifugal forces. Another system uses a reciprocating piston to create opposite straight line forces. In the case of the former, the centrifugal forces are not always desirable, because it is desired to use forces created in a straight line. However, the piston type vibrator is objectionable because it is noisy in operation and is limited as to the source of input drive that can be used. The disadvantages of both known systems are eliminated by the present invention in the provision of an endless flexible means, such as a chain, trained about a pair or more of carriers, such as sprockets, and the chain carries weight means in a localized or concentrated area thereof. Consequently, as the chain travels in its closed circuit or path about the sprockets, the weight means travels along the run of the chain between the two sprockets and then is caused to turn the corner formed by one of the sprockets, thus creating a departure force as the weight means turns the corner. It is a further object of the invention to employ this novel principle in association with several carriers or sprockets arranged in the form of a triangle, a square, or other arrangements, thereby inducing line, triangular, square or other modes of vibration according to the departure forces created by the weight means when turning the corners provided by the sprockets or carriers. Further objects of the invention reside in improved means for driving the system and the use of sprockets or carriers or their equivalents of different diameters for varying the force components generated.

The foregoing and other important objects and desirable features inherent in and encompassed by the invention will become apparent from the following description of the preferred embodiments of the invention as illustrated in the accompanying sheet of drawings, the several figures of which are described below.

Figure 1:
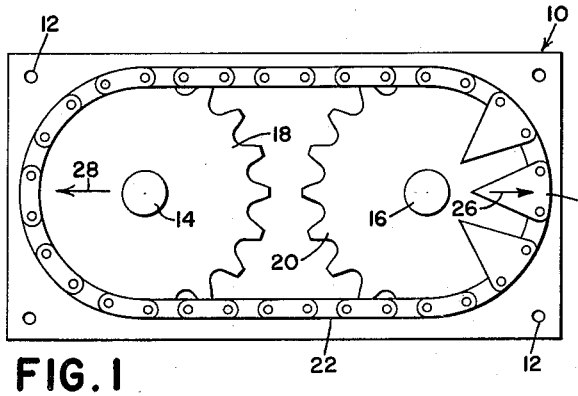
Figure 1 is an elevation of a simple chain and sprocket system embodying the principles of the invention.

In the basic system shown in Figure 1, the numeral 10 represents typical support means by which the vibrator may be mounted on an object to be vibrated. In the present case, the support means is shown in simple fashion merely for the purposes of disclosure. The support means has a plurality of holes 12 by means of which it may be bolted or otherwise attached to the object to be vibrated.

Included in the support means are first and second shafts 14 and 16 and these shafts respectively mount sprockets 18 and 20. An endless link chain 22 is trained about the two sprockets and is provided in a localized or concentrated area thereof with weight means 24. In its broadest sense, the chain 22 represents endless flexible means and the sprockets 18 and 20 are carriers. In the present case they are rotary elements and because of the teeth thereon and their engagement with the chain 22, the system is free of friction and slip. It will be understood, however, that the principles of the invention can be exploited in constructions obviously different from the representative illustration in Figure 1. For example, in a commercial embodiment, the chain and sprockets would be enclosed in a suitable casing. These details however are deemed to be unnecessary to the present description of the broad concept.

In the operation of the system of Figure 1, the chain 22 is driven, by means to be described below, so that, because of the sprockets 18 and 20, it travels in a closed circuit or path. Because the weight means 24 is affixed to the chain, the weight means will of course follow the same path. As the weight means turns the corners afforded by the sprockets, straight line forces will be generated. For example, the force generated as the weight means moves about the sprocket 20 may be regarded as occurring in the direction of the arrow 26. As the weight means travel along the straight run of the path of the chain and turn about the sprocket 18, the force will be developed in the direction of the arrow 28. As the weight means follows the straight line portions of the path no centrifugal force will be created.

Figure 2:
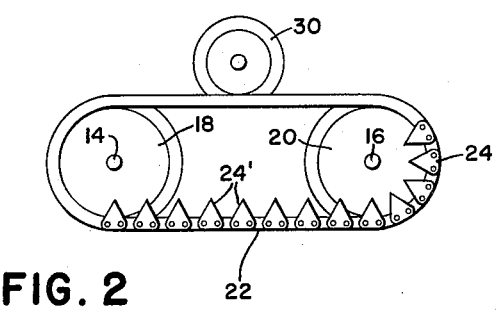
Figure 2 is a similar view, drawn to an enlarged scale, showing one example of means for driving the system of Figure 1, plus modified weight means.

In the system of Figure 1, one of the shafts 14 or 16 may be directly driven by any suitable input means, such as an electric or pneumatic motor, for example. In that case, the associated sprocket will be keyed to the shaft and the other sprocket will be an idler. However, as shown in Figure 2, the chain 22 may be driven directly from an input means including a sprocket 30, and both sprockets 18 and 20 will be idlers on their respective shafts 14 and 16. It will be clear that in Figure 2, as well as in Figures 3 through 6, the chains and sprockets are shown schematically.

Figure 3:
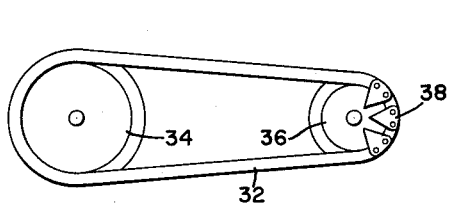
Figure 3 is a view similar to Figure 1, but drawn to a smaller scale and largely schematic, and illustrating a system in which the sprockets or carriers are of dissimilar diameters.

The embodiment shown in Figure 3 employs a chain 32 trained about sprockets 34 and 36 of different diameters and, like the chain 22, carries weight means, here designated by the numeral 38. Either form of drive, described so far, may be used with the embodiment of Figure 3. The feature of this embodiment is that forces of different magnitudes may be developed at opposite ends of the system because of the dissimilar sprockets 34 and 36.

Figure 4:
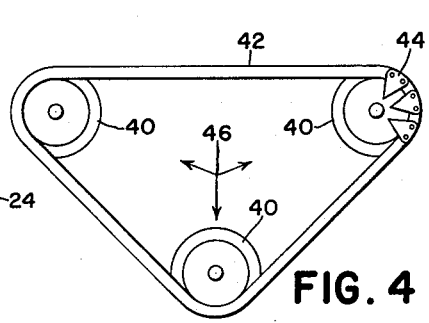
Figure 4 is a reduced schematic view showing an arrangement of the system in a triangular pattern.

Figure 4 shows a system in which the carriers or sprockets are arranged in triangular fashion. In this case, there are three sprockets 40, which are similar, and these have trained thereabout an endless flexible means or chain 42 equipped with weight means 44. In this case, the force components will be developed in the general directions of the three arrows shown at 46. Here again, any suitable drive means may be employed.

Figure 5:
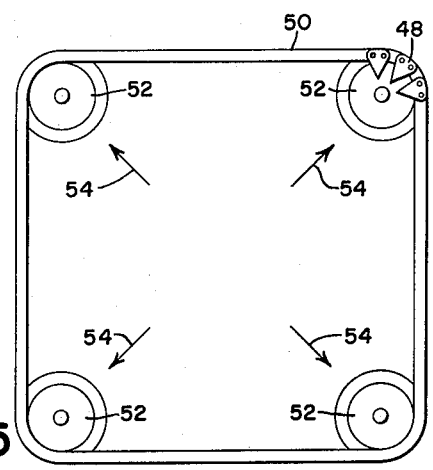
Figure 5 shows a square pattern.

Figure 5 illustrates the system operating in a square pattern in which weight means 48, carried by a chain 50, which is trained about four sprockets 52, will develop forces generally in the directions of the arrows 54.

Figure 6:
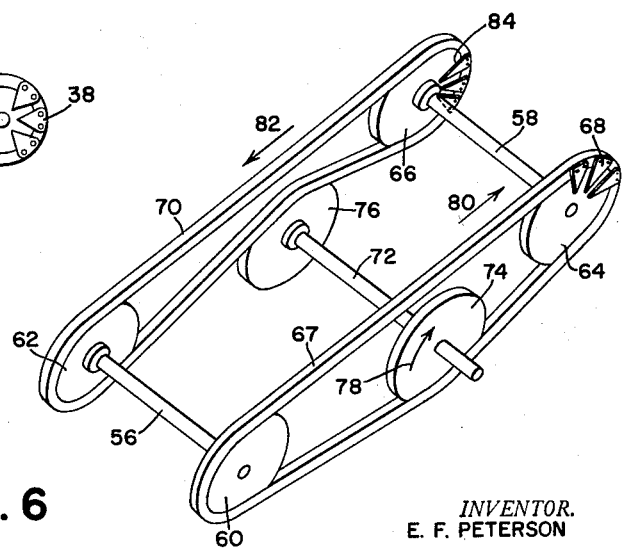
Figure 6 is a perspective schematic view showing a dual system.

In the dual system shown in Figure 6 which, like Figures 2 through 5, is schematic, a pair of shafts 56 and 58 are spaced apart and parallel. These shafts may be mounted on any suitable support means such as that shown at 10. This is true, of course, of the embodiments shown in Figures 2 through 5.

The shaft 56 carries at opposite ends thereof a pair of sprockets 60 and 62. These are journaled on the shaft. Sprockets 64 and 66 are journaled on the shaft 58. An endless flexible means in the form of a chain 66 is trained about the sprockets 60 and 64 and forms part of the first vibrator phase of the dual system. This chain carries weight means 68. A second chain 70 is trained about the other two sprockets 62 and 66 and forms the second phase of the dual system.

The feature of this embodiment is that the two systems operate in opposite directions. That is to say, the chains are driven in opposite directions. This is accomplished by the provision of an input shaft 72 having keyed thereto first and second input sprockets 74 and 76. It may be assumed that the shaft 72 rotates in the direction of the arrow 78. In that case, the chain 67 will travel in the direction of the arrow 80 and the chain 70 will travel in the opposite direction as shown by the arrow 82. The two phases of the system may be regarded as identical so that the weight means 68 on the chain 67 is similar to the weight means 84 on the chain 70. The chains and weight means are timed so that both weight means 68 and 84 turn the same "corner" at the same time. Thus, the forces generated thereby augment each other. This is true at opposite ends of the system. At the same time, as the weights travel through the respective straight line portions of their paths, they create no unbalancing forces. A drive system other than that illustrated may be employed, the purpose of the illustration being merely to show a representative form of this embodiment.

Referring back to Figure 2, it will be noted that the weight means 24 has been augmented by additional weight means 24', occupying a substantial portion of the length of the chain. Although, as will be clear later, the weight means may be varied as to proportion and zones, the particular illustration in Figure 2 shows the portion of the chain occupied by the weight means 24 and 24' equals the center-to-center distance between the shafts 14 and 16 plus one-fourth of the circumference of the sprocket 20. This produces maximum departure force duration without linear force cancellation at the opposite end. By varying the area occupied by the weights, departure forces may be varied in duration without changing sprocket speed, which cannot be achieved in a straight rotary or piston system. At the same time, in the present system, variations in duration may be had without change force magnitude. This feature can of course be employed in any of the illustrated modifications.

It should also be observed that the expression "fluent materials" includes but is not limited to granular, powdered and lump material, machine parts, scrap, glass, plastic, wood, etc., besides fluids such as syrups, paints, fluidized powders, etc., thixatropic materials, vegetables, fruits, meats, nuts, meal, coffee, sugar, etc. and like materials handled from bulk to measured quantities or packages.

As was stated above, the schematic illustrations will readily lend themselves to embodiment in commercial form, such as by the enclosure in housings and the provision of commercially acceptable drive means. These and other changes may be easily made without departing from the spirit and scope of the invention.

What is claimed is:

1. A vibrator system, comprising: support means including a pair of spaced apart carriers; endless flexible means trained about the carriers and drivable to travel a closed circuit in which the carriers provide spaced apart corners; and weight means carried by the flexible means in a concentrated area thereof to travel therewith in said circuit whereby to create unbalanced forces when turning said corners.

2. The invention defined in claim 1, in which: at least one of said carriers is a rotary element adapted to be driven and said flexible means has drive engagement with said one element.

3. The invention defined in claim 1, in which: the carriers are of the same size so as to define identical corners in said circuit.

4. The invention defined in claim 1, in which: the carriers are of different sizes so as to define corners of different sizes in said circuit.

5. The invention defined in claim 1, including: a third carrier additionally supporting the flexible means to establish a third corner so that the circuit is triangular.

6. The invention defined in claim 1, including: third and fourth carriers additionally supporting the flexible means to establish third and fourth corners so that the circuit is generally rectangular.

7. The invention defined in claim 1, including: third and fourth carriers additionally supporting the flexible means to establish third and fourth corners so that the circuit has four corners and four sides.

8. The invention defined in claim 1, in which: each carrier is a sprocket and the flexible means is a chain trained about said sprockets.

9. The invention defined in claim 1, including: the support means includes an additional pair of carriers respectively adjacent to the carriers of the first-mentioned pair; and an additional endless flexible means parallel to the first-mentioned flexible means and trained about said additional carriers and drivable in a direction opposite to that of the first-mentioned flexible means so as to travel in an additional closed circuit in which the additional carriers provide spaced apart corners, said additional flexible means having weight means thereon in a concentrated area thereof.

10. The invention defined in claim 9, in which: the carriers of the additional pair are respectively transversely alined with the carriers of the first-mentioned pair so that the corners of the additional circuit are respectively alined with those of the first-mentioned circuit; and the weight means on the additional flexible means is substantially identical to the weight means on the first-mentioned flexible means; and the two weight means are timed relative to each other to turn the same respective corners at the same time while traveling in opposite directions.

11. The invention defined in claim 1, in which: the support means includes a pair of spaced apart parallel shafts and the carriers are respectively first and second rotary elements carried respectively on said shafts; and the flexible means is trained about said elements.

12. The invention defined in claim 11, including: third and fourth rotary elements journaled respectively on the shafts, said first and second elements being likewise journaled respectively on said shafts; and an additional endless flexible means trained about the third and fourth elements and drivable in the direction opposite to that of the first-mentioned flexible means, and said additional flexible means having weight means thereon in a concentrated area thereof.

13. A vibrator system, comprising: endless flexible means having weight means carried thereby in a concentrated area thereof; and support means including spaced carriers about which the flexible means is trained to travel in a non-circular closed path, certain of said carriers affording in said path a relatively abrupt corner at which the weight means will develop a force of substantial magnitude as it tends to depart from the flexible means.

14. The invention defined in claim 14, in which: the carriers are so arranged that at least one run of the flexible means lies in a straight-line portion of said path whereby the weight means is free from centrifugal force when traveling in said portion.

15. A vibrator system, comprising: endless flexible means having weight means carried thereby in a portion thereof less than the perimeter thereof; and support means including spaced carriers about which the flexible means is trained to travel in a non-circular closed path, certain of said carriers affording in said path a relatively abrupt corner at which the weight means will develop a force of substantial magnitude as it tends to depart from the flexible means.

References Cited in the file of this patent

UNITED STATES PATENTS

| | | |
|---|---|---|
| 547,737 | O'Kelley et al. | Oct. 8, 1895 |
| 2,144,382 | Lincoln et al. | Jan. 17, 1939 |